3,370,047
POUR POINT DEPRESSANTS AND LUBRICATING
COMPOSITIONS THEREOF
Russell H. Raines, St. Albans, W. Va., assignor to Union
Carbide Corporation, a corporation of New York
No Drawing. Filed Sept. 3, 1964, Ser. No. 394,327
9 Claims. (Cl. 260—78.5)

This invention relates to novel resin compositions and to lubricating compositions produced therewith; in particular to lubricating compositions containing said resin compositions as pour point depressants.

The novel resin compositions are the bicyclo[2.2.1]-hept-2-ene/N-hydrocarbylmaleimide copolymers of the formula

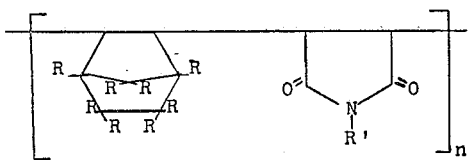

I wherein R and R' are as hereinafter further defined.

The copolymers used as pour point depressants are those bicyclo[2.2.1]hept-2-ene/N - hydrocarbylmaleimide copolymers that are soluble in the hydrocarbon lubricating oils; these are preferably those in which the N-hydrocarbyl substituent is a linear or branched alkyl radical having from 8 to about 24 carbon atoms.

The maleimide copolymers of Formula I are readily produced by the reaction of stoichiometric amounts of an alternating bicyclo[2.2.1]hept-2-ene/maleic anhydride copolymer with an organic primary amine at a temperature of from about 75° C. to about 300° C., preferably at from about 125° C. to 250° C. With the low boiling amines, reflux temperature is preferred. The pressure of the reaction will vary depending upon the amine being used in the reaction. Thus, it can be carried out at atmospheric pressure or super atmospheric pressure up to about 1000 p.s.i., or more, depending upon the volatility and reactivity of the amine, with the higher pressures preferred as the boiling point of the amine decreases. If desired an inert organic solvent can be present. This solvent serves two purposes, as a diluent and also as an azeotroping agent to remove the water formed during the reaction. Illustrative solvents include benzene, toluene, and the like.

The organic amines reacted with the bicyclo[2.2.1]-hept-2-ene/maleic anhydride copolymers to produce the bicyclo[2.2.1]hept-2 - ene/N - hydrocarbyl maleimide copolymers are represented by the formula $$R'NH_2 \qquad\qquad II$$

wherein R' is a hydrocarbyl radical having from 1 to about 30 carbon atoms. The hydrocarbyl radicals are alkyl radicals such as methyl, ethyl, propyl, isopropyl, pentyl, neopentyl, octyl, 2-ethylhexyl, nonyl, decyl, dodecyl, tetradecyl, pentadecyl, hexadecyl, octadecyl, nonadecyl, eicosane, docosane, tetracosane, pentacosane, octacosane, triacontane, and the like; aryl radicals such as phenyl, naphthyl, biphenyl, and the like; aralkyl radicals such as benzyl, phenethyl, alpha mesityl, naphthal, and the like; alkaryl radicals such as tolyl, xylyl, mesityl, methylnaphthyl, and the like; and cycloalkyl radicals such as cyclobutyl, cyclopentyl, methylcyclopentyl, dimethylcyclopentyl, ethylcyclopentyl, cyclohexyl, methylcyclohexyl, cycloheptyl, and the like.

Illustrative of suitable amines corresponding to Formula II are methylamine, ethylamine, butylamine, 2-ethylhexylamine, decylamine, dodecylamine, tetradecylamine, hexadecylamine, octadecylamine, eicosylamine, tetracosylamine, heptacosylamine, triacosylamine, aniline, naphthylamine, biphenylamine, benzylamine, phenethylamine, tolylamine, ar-methylnaphthylamine, cyclopentylamine, cyclohexylamine, ethylcyclopentylamine, and the like.

The maleic anhydride copolymers are produced by the copolymerization of maleic anhydride with a bicyclo [2.2.1]hept-2-ene of the formula:

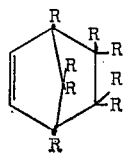

III wherein each R represents a hydrogen atom, a hydrocarbyl radical having from 1 to about 15 carbon atoms, or a —$C_nH_{2n}OOCR''$ radical wherein $n$ is an integer having a value of from 0 to about 10 and R'' is a hydrocarbyl radical containing up to about 20 carbon atoms. As used throughout this application, the term "hydrocarbyl radical" defines a radical containing hydrogen and carbon atoms only. The hydrocarbyl radicals are alkyl radicals containing from 1 to about 15 carbon atoms such as methyl, ethyl, propyl, isopropyl, pentyl, octyl, 2-ethylhexyl, nonyl, decyl, dodecyl, pentadecyl, and the like; aryl radicals, such as phenyl, naphthyl, and the like; aralkyl radicals, such as benzyl, phenethyl, alpha mesityl, naphthal, and the like; alkaryl radicals, such as tolyl, xylyl, mesityl, methylnaphthyl, and the like; and cycloalkyl radicals, such as cyclobutyl, cyclopentyl, methylcyclopentyl, dimethylcyclopentyl, ethylcyclopentyl, cyclohexyl, methylcyclohexyl, cycloheptyl, and the like.

Illustrative of the bicyclo[2.2.1]hept - 2 - enes corresponding to Formula III, one can mention:

Bicyclo[2.2.1]hept-2-ene,
1-methylbicyclo[2.2.1]hept-2-ene,
5-methylbicyclo[2.2.1]hept-2-ene,
7-methylbicyclo[2.2.1]hept-2-ene,
1-ethylbicyclo[2.2.1]hept-2-ene,
5-ethylbicyclo[2.2.1]hept-2-ene,
5-isopropylbicyclo[2.2.1]hept-2-ene,
5-pentylbicyclo[2.2.1]hept-2-ene,
5-heptylbicyclo[2.2.1]hept-2-ene,
5-(2-ethylhexyl)bicyclo[2.2.1]hept-2-ene,
7-octylbicyclo[2.2.1]hept-2-ene,
1-nonylbicyclo[2.2.1]hept-2-ene,
5-nonylbicyclo[2.2.1]hept-2-ene,
5-dodecylbicyclo[2.2.1]hept-2-ene,
5-pentadecylbicyclo[2.2.1]hept-2-ene,
5,5-dimethylbicyclo[2.2.1]hept-2-ene,
1,4-diisopropylbicyclo[2.2.1]hept-2-ene,
5,5-diisopropylbicyclo[2.2.1]hept-2-ene,
5,5-dibutylbicyclo[2.2.1]hept-2-ene,
5,5-dihexylbicyclo[2.2.1]hept-2-ene,
5-methyl-5-ethylbicyclo[2.2.1]hept-2-ene,
5,5-didecylbicyclo[2.2.1]hept-2-ene,
5,6-dimethylbicyclo[2.2.1]hept-2-ene,
5-methyl-6-ethylbicyclo[2.2.1]hept-2-ene,
5,6-dipropylbicyclo[2.2.1]hept-2-ene,
5,6-diisopropylbicyclo[2.2.1]hept-2-ene,
5,6-dipentylbicyclo[2.2.1]hept-2-ene,
5,6-di(2-ethylhexyl)bicyclo[2.2.1]hept-2-ene,
5,6-didodecylbicyclo[2.2.1]hept-2-ene,
5,5,6-trimethylbicyclo[2.2.1]hept-2-ene,
5,5,6-tripropylbicyclo[2.2.1]hept-2-ene,
5,5-dimethyl-6-ethylbicyclo[2.2.1]hept-2-ene, 5,5,6,6-tetramethylbicyclo[2.2.1]hept-2-ene,
5,5,6,6-tetraisopropylbicyclo[2.2.1]hept-2-ene,
5,5-dimethyl-6,6-diethylbicyclo[2.2.1]hept-2-ene,
1-phenylbicyclo[2.2.1]hept-2-ene,
5-phenylbicyclo[2.2.1]hept-2-ene,
7-phenylbicyclo[2.2.1]hept-2-ene,
5-naphthylbicyclo[2.2.1]hept-2-ene,
5,5-diphenylbicyclo[2.2.1]hept-2-ene,
5,6-diphenylbicyclo[2.2.1]hept-2-ene,
5,5,6-triphenylbicyclo[2.2.1]hept-2-ene,
2-benzylbicyclo[2.2.1]hept-2-ene,
5-benzylbicyclo[2.2.1]hept-2-ene,
5-phenethylbicyclo[2.2.1]hept-2-ene,
5,6-dibenzylbicyclo[2.2.1]hept-2-ene,
5-α-mesitylbicyclo[2.2.1]hept-2-ene,
5-naphthalbicyclo[2.2.1]hept-2-ene,
5-tolybicyclo[2.2.1]hept-2-ene,
5,6-ditolybicyclo[2.2.1]hept-2-ene,
5-xylylbicyclo[2.2.1]hept-2-ene,
5-methylnaphthylbicyclo[2.2.1]hept-2-ene,
5-cyclobutylbicyclo[2.2.1]hept-2-ene,
5,6-dicyclopentylbicyclo[2.2.1]hept-2-ene,
5-methylcyclopentylbicyclo[2.2.1]hept-2-ene,
5-isopropylcyclopentylbicyclo[2.2.1]hept-2-ene,
5-cyclohexylbicyclo[2.2.1]hept-2-ene,
bicyclo[2.2.1]hept-2-en-5-yl-acetate,
bicyclo[2.2.1]hept-2-en-5-yl-methyl acetate,
bicyclo[2.2.1]hept-2-en-5-yl-butyl propionate,
bicyclo[2.2.1]hept-2-en-5-yl-decyl hexanoate,
bicyclo[2.2.1]hept-2-en-5-yl-methyl laurate,
bicyclo[2.2.1]hept-2-en-5-yl-methyl stearate,
bicyclo[2.2.1]hept-2-en-5-yl-propyl decanoate,
1-methylbicyclo[2.2.1]hept-2-en-5-yl-methyl stearate,
1-methylbicyclo[2.2.1]hept-2-en-6-yl-methyl stearate,
1-butylbicyclo[2.2.1]hept-2-en-5-yl-methyl stearate,
1-phenylbicyclo[2.2.1]hept-2-en-5-yl-methyl laurate,
and the like.

These substituted bicyclo[2.2.1]hept-2-enes are readily produced from cyclopentadiene or dicyclopentadiene compounds and an unsaturated compound of the formula:

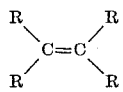

by the procedures set forth in United States Patent 2,340,908.

The polymerization of the bicyclo[2.2.1]hept-2-ene and the maleic anhydride can be conducted in the presence of an inert liquid, which can be a solvent for either or both monomers, if desired. Suitable for use one can mention, for example, cyclohexanone, toluene, benzene, chlorobenzene, acetone, acetonitrile, isopropanol, heptane, octane, decane, refined kerosene, and the like.

The temperature of polymerization reaction can be from about 0° C. or lower to about 200° C. or higher, and is not narrowly critical. Preferred temperatures are from about 15° C. to about 150° C. The pressure can be subatmospheric, atmospheric or superatmospheric pressure and is not critical. Autogenous reactor pressures are preferred in a sealed system.

The polymerization can be carried out in the presence of a catalytic amount of a free radical initiator, said amount being sufficient to catalyze the polymerization reaction. The free radical initiators that can be employed are well known to the ordinary chemist skilled in the art, and the term "free radical initiator" has an established and recognized meaning to the skilled chemist. The catalytic amount can be varied from about 1 p.p.m. to about 10,000 p.p.m. or more, preferably, from about 1 p.p.m. to about 1,000 p.p.m., and most preferably from about 2 p.p.m. to about 200 p.p.m., based on the total amount of polymerizable monomers. Among the initiators suitable for use are those which initiate the formation of free radicals under the reaction conditions, such as molecular oxygen, peroxides, azo compounds, and so forth. The catalysts can be used singly or in combination. Illustrative are the azo type catalysts disclosed in the United States Patent 2,471,959; the peroxides, such as hydrogen peroxide, lauroyl peroxide, dipropionyl peroxide, butyryl peroxide, benzoyl peroxide, acetyl peroxide, peracetic acid, di-teritiary-butyl peroxide, tertiary-butyl hydroperoxide, hydroxyheptyl peroxide, acetyl benzoyl peroxide, diethyl peroxide, succinoyl peroxide, urea peroxide, tetralin peroxide, and so forth; the alkali metal persulfates, perborates, and percarbonates; the ammonium persulfates, perborates, and percarbonates; diisopropyl peroxydicarbonate; and the like.

As previously indicated the bicyclo[2.2.1]hept-2-ene/N-hydrocarbylmaleimide copolymers can be used as pour point depressants in the production of hydrocarbon lubricating oil compositions. These oil compositions comprise a major amount of a hydrocarbon oil and a minor amount of the maleimide copolymer of Formula I. The amount of the maleimide copolymer can vary over a range dependent to some extent upon the application in which the hydrocarbon oil is to be used and the particular oil being used, including the effect the presence of other addition agents normally added to hydrocarbon oils may have upon the maleimide copolymer. Generally, an amount not in excess of 10 weight percent is adequate. However, when used with other additives in the formulation the amount will vary from about 0.02 percent to about 2 percent; but it is preferable to use amount from about 0.04 percent to about 1 percent, based upon the weight of the oil content.

The pour point depressants of this invention can be used in any hydrocarbon oil or hydrocarbon oil composition either alone or in conjunction with known polymeric viscosity index improvers, dispersants, stabilizers, antioxidants, detergency agents, etc. used in formulations for automotive crankcase oils, automotive transmission fluids, etc. The selection of the preferred pour point depressant will depend, as indicated, upon many factors, and this selection will be a simple matter to one skilled in the art in view of the teachings herein. One of the important factors taken into consideration is the solubility of the depressant in the hydrocarbon oil and its effect upon the pour point. It has been found that those depressants wherein R' of Formula I is an alkyl group having from 8 to 24 carbon atoms satisfy these requirements. Pour point depressants containing some copolymer wherein R' is an alkyl group having from 8 to 14 carbon atoms are suitable when the copolymers are produced using a mixture containing sufficient primary amines having more than 14 carbon atoms so that the bicyclo[2.2.1]hept-2-ene/maleimide copolymers are soluble in the hydrocarbon oil. When the primary amine used contains more than 14 carbon atoms, a mixture is not necessary, though it can be used if desired. The use of the pour point depressants of this invention has shown reduction of pour points as much as 50° F. in some formulations when using 0.2 percent or less of the depressants.

The following examples further serve to illustrate the invention. Parts are by weight unless otherwise indicated.

Bicyclo[2.2.1]hept-2-ene/maleic anhydride copolymer was produced by charging 141 parts of bicyclo[2.2.1]hept-2-ene, 49 parts of maleic anhydride, 40 parts of toluene and 0.95 part of diacetyl peroxide to a reactor. The reactor was flushed with nitrogen, sealed and the contents stirred at 50° C. for 26 hours. The copolymer was recovered by adding the reaction mixture to heptane, filtering the precipitated copolymer, washing it with benzene and then drying in vacuo. There was recovered 56 parts of the alternating bicyclo[2.2.1]hept-2-ene/maleic anhydride copolymer having a reduced viscosity of 0.27 at 30° C. at a concentration of 0.2 g./100 ml. of cyclohexane.

In a similar manner the following alternating copolymers are produced:

1-methylbicyclo[2.2.1]hept-2-ene/maleic anhydride
5-ethylbicyclo[2.2.1]hept-2-ene/maleic anhydride
5-(2-ethylhexyl)bicyclo[2.2.1]hept-2-ene/maleic anhydride
1,6-dimethylbicyclo[2.2.1]hept-2-ene/maleic anhydride
5,5-dimethylbicyclo[2.2.1]hept-2-ene/maleic anhydride
5,6-dimethylbicyclo[2.2.1]hept-2-ene/maleic anhydride
5-phenylbicyclo[2.2.1]hept-2-ene-/maleic anhydride
5-benzylbicyclo[2.2.1]hept-2-ene/maleic anhydride
5-tolylbicyclo[2.2.1]hept-2-ene/maleic anhydride
5-cyclobutylbicyclo[2.2.1]hept-2-ene/maleic anhydride
5-cyclopentylbicyclo[2.2.1]hept-2-ene/maleic anhydride
Bicyclo[2.2.1]hept-2-ene/1-methylbicyclo[2.2.1]hept-2-ene/maleic anhydride.

EXAMPLE 1

To a 500 ml., 3-necked, creased flask fitted with a stirrer, thermowell and distillation head there were added 12.82 parts of bicyclo[2.2.1]hept-2-ene/maleic anhydride copolymer, 17.95 grams of octadecylamine and the temperature was maintained at 200–210° C. for 3 hours. The bicyclo[2.2.1]hept-2-ene/N - octadecylmaleimide copolymer produced was dissolved in benzene, filtered and solvent exchanged into a 150 SUS solvent-refined Mid-Continent oil to produce a concentrate having 32.5 percent total solids. A portion of this concentrate was added to a 200 SUS solvent-refined Mid-Continent oil to produce a hydrocarbon oil composition containing 0.2 percent by weight of the bicyclo[2.2.1]hept-2-ene/N-octadecylmaleimide copolymer as pour point depressant. The pour point of the unmodified oil was 5° F. (ASTM D97–57) and that of the composition containing the depressant was −10° F.

The following N-octadecylmaleimide copolymers are produced in the same manner and are also useful as pour point depressants in compositions similar to that set forth above:

1-methylbicyclo[2.2.1]hept-2-ene/N-octadecylmaleimide,
5-(2-ethylhexyl)bicyclo[2.2.1]hept-2-ene/N-octadecylmaleimide,
5-benzylbicyclo[2.2.1]hept-2-ene/N-octadecylmaleimide.

The same procedure is used to produce the following N-hydrocarbylmaleimide copolymers by substitution of the corresponding organic amine for the octadecylamine used above:

bicyclo[2.2.1]hept-2-ene/N-methylmaleimide,
bicyclo[2.2.1]hept-2-ene/N-isopropylmaleimide,
bicyclo[2.2.1]hept-2-ene/N-nonylmaleimide,
bicyclo[2.2.1]hept-2-ene/N-tetracosylmaleimide,
bicyclo[2.2.1]hept-2-ene/N-phenylmaleimide,
bicyclo[2.2.1]hept-2-ene/N-benzylmaleimide,
bicyclo[2.2.1]hept-2-ene/N-tolylmaleimide,
bicyclo[2.2.1]hept-2-ene/N-cyclopentylmaleimide.

EXAMPLE 2

In a manner similar to that described in Example 1, a concentrate was produced containing 21.6 weight percent bicyclo[2.2.1]hept-2-ene/N-octadecylmaleimide in a 150 SUS solvent-refined Mid-Continent oil.

The concentrate was used in various formulations and the pour points determined. The base oils were a 200 SUS solvent refined Mid-Continent oil (Oil A), a commercially available fully formulated SAE 30 hydrocarbon oil (Oil B) and a commercially available fully formulated SAE 10 hydrocarbon oil (Oil C). These commercially available formulated oils normally contain detergents, dispersants and anti-oxidants.

The data and results are tabulated below:

| | Pour Point of Oil Formulation, ° F. | | |
|---|---|---|---|
| | A | B | C |
| Weight percent of depressant: | | | |
| None | 5 | 30 | 5 |
| 0.05 | | −15 | −15 |
| 0.1 | | −20 | −15 |
| 0.2 | −10 | | |
| 0.5 | −10 | | |

EXAMPLE 3

In a manner similar to that described in Example 1, a mixture of 12.82 parts of bicyclo[2.2.1]hept-2-ene/maleic anhydride copolymer and 14.2 parts of tetradecylamine was reacted at 200° to 206° C. for about 3.5 hours. Benzene was then added to dissolve the maleimide copolymer produced and the solution of the bicyclo[2.2.1]hept-2-ene/N-tetradecylmaleimide copolymer was filtered and the filtrate was solvent exchanged into a 150 SUS solvent-refined Mid-Continent oil to produce a concentrate having 26.2 percent total solids. The concentrate was used to produce hydrocarbon oil compositions containing 0.2 and 0.5 weight percent of the pour point depressant; the base oil was a 200 SUS solvent-refined Mid-Continent oil having a pour point of 5° F. The pour points of the oil compositions containing the pour point depressant were −25° F.

This example delineates the lower limit of the alkyl R' group permitted for the use of a copolymer produced from a single amine from a single amine as a pour point depressant; a trace amount of a precipitate was observed. In Example 4 no precipitate was observed with the hexadecylamine compound; in Example 5 a mixture of tetradecyl and hexadecyl amines was also free of precipitate and in Example 6 a mixture of dodecyl, tetradecyl, hexadecyl and octadecyl amines was also suitable.

EXAMPLE 4

In a manner similar to that described in Example 1, a mixture of 12.82 parts of bicyclo[2.2.1]hept-2-ene/maleic anhydride copolymer and 16.1 parts of hexadecylamine was reacted at 205° to 210° C. for about 3.5 hours. The bicyclo[2.2.1]hept-2-ene/N - hexadecylmaleimide copolymer produced was used to prepare a hydrocarbon oil concentrate having a 25.6 weight percent total solids content; the oil used was a 150 SUS solvent-refined Mid-Continent oil.

The concentrate was used in various hydrocarbon oil formulations and their pour points were determined. The base oils were Oil A, Oil B and a typical 80 SUS automatic transmission fluid (Oil D). The data and results are tabulated below:

| | Pour point of Oil Formulation, ° F. | | |
|---|---|---|---|
| | A | B | D |
| Weight percent of depressant: | | | |
| None | 5 | 30 | −10 |
| 0.05 | −15 | | −45 |
| 0.1 | −20 | | −45 |
| 0.4 | −25 | 5 | −45 |

A formulation was also prepared containing 0.12 part of the bicyclo[2.2.1]hept-2-ene/N-hexadecylmaleimide copolymer, 3.75 parts of a commercially available acrylic polymeric viscosity index improver, 4.95 parts of a commercially available detergent-inhibitor package containing barium sulfonates and zinc dialkyl dithiophosphates (Lubrizol 1739) and 91.18 parts of base Oil A. The formulation was clear and had a pour point of −25° F. in comparison to a pour point of 5° F. for the base oil which was Oil A.

EXAMPLE 5

In a manner similar to that described in Example 1, a mixture of 19.2 parts of the bicyclo[2.2.1]hept-2-ene/maleic anhydride copolymer, 12.05 parts of hexadecylamine and 10.68 parts of tetradecylamine was reacted at about 210° C. for about 2 hours. The bicyclo[2.2.1]hept-2-ene/N-hydrocarbylmaleimide copolymer produced consisted of a 50/50 mixture of tetradecyl and hexadecyl hydrocarbyl groups. A concentrate was produced having a total solids content of 23.5 weight percent by the procedure of Example 1 using base Oil A in the solvent exchange.

The concentrate was used to produce hydrocarbon oil formulations and their pour points were determined. The base oils were Oil A and Oil D. The data and results are tabulated below:

|  | Pour point of Oil formulation, °F. | |
|---|---|---|
|  | A | D |
| Weigh percent of depressant: |  |  |
| None | 5 | −10 |
| 0.1 | −25 | −50 |
| 0.2 | −30 |  |

A formulation was also prepared containing 0.12 percent of the pour point depressant, 3.75 percent of a polymeric viscosity index improver, 4.95 percent of a detergent-inhibitor package and 91.18 percent of base Oil A as described in Example 4. This fully formulated hydrocarbon oil composition had a pour point of −25° F. in comparison to a pour point of 5° F. for the base oil, Oil A.

EXAMPLE 6

In a manner similar to that described in Example 1, a mixture of 12.82 parts of the bicyclo[2.2.1]hept-2-ene/maleic anhydride copolymer and 8.98 parts of octadecylamine was reacted at about 200° C. for 25 minutes. Then 4.025 parts of hexadecylamine, 2.845 parts of tetradecylamine and 0.618 part of dodecylamine were added and the reaction was continued for another 45 minutes. The bicyclo[2.2.1]hept - 2 - ene/N-hydrocarbylmaleimide copolymer produced consisted of a 50/25/20/5 mixture wherein the hydrocarbyl groups were octadecyl, hexadecyl, tetradecyl and dodecyl, respectively. A concentrate having a total resin solids content of 37.3 weight percent was prepared as described in Example 1.

The concentrate was used in various hydrocarbon oil formulations and their pour points were determined. The base oils were Oil A, Oil B, Oil C and Oil D. The data and results are tabulated below:

|  | Pour point of Oil formulation, °F. | | | |
|---|---|---|---|---|
|  | A | B | C | D |
| Weight percent of depressant: |  |  |  |  |
| None | 5 | 30 | 5 | −10 |
| 0.05 |  | −5 |  |  |
| 0.1 | −25 | −10 | −20 | −45 |
| 0.2 | −25 |  | −25 | −45 |

EXAMPLE 7

In a manner similar to that described in Example 1, a mixture of 6.5 parts of the bicyclo[2.2.1]hept-2-en-5-ylmethyl stearate/maleic anhydride copolymer, 3.59 parts of tetradecylamine and 4.15 parts of hexadecylamine was reacted at about 200° C. to 205° C. for about 1 hour. The bicyclo[2.2.1]hept-2-en-5-ylmethyl stearate/N-tetradecylmaleimide copolymer was dissolved in benzene, filtered and solvent exchanged into a 150 SUS solvent-refined Mid-Continent oil to produce a concentrate having 37.3 percent total solids. The concentrate was used to produce a hydrocarbon oil composition containing 0.2 weight percent of the pour point depressant using a 200 SUS solvent-refined Mid-Continent oil having a pour point of 5° F. as the base oil. The formulation containing the maleimide copolymer as pour point depressant had a pour point of −10° F.

EXAMPLE 8

In a manner similar to that described in Example 1, a mixture of 6.76 parts of the bicyclo[2.2.1]hept-2-en-5-ylmethyl laurate/maleic anhydride copolymer, 2.37 parts of tetradecylamine and 2.68 parts of hexadecylamine was reacted at about 200° C. for about 1.5 hours. The bicyclo[2.2.1]hept-2-en-5-ylmethyl laurate/N-hydrocarbyl maleimide copolymer obtained was added to 58.3 parts of benzene and then separated into two portions. One portion of about 27.8 parts was poured into methanol and the solid maleimide copolymer was recovered. This was redissolved in benzene and solvent-exchanged into a 150 SUS Mid-Continent oil to produce a concentrate of 20.4 weight percent total solids, the purpose being to determine if separation would have any effect on the pour point of a formulated oil (Fraction I). The second portion of about 42.3 parts was directly solvent-exchanged into a 150 SUS solvent-refined Mid-Continent oil to produce a concentrate having 26.7 percent total solids (Fraction II).

The two fraction were used to prepare oil formulations containing 0.2 weight percent of the pour point depressant; the base oil used was a 200 SUS solvent-refined Mid-Continent oil having a pour point of 50° F. The two formulations with the pour point depressant each had a pour point of −30° F.

What is claimed is:

1. A bicyclo[2.2.1]hept - 2 - ene/N-hydrocarbylmaleimide polymer of the formula

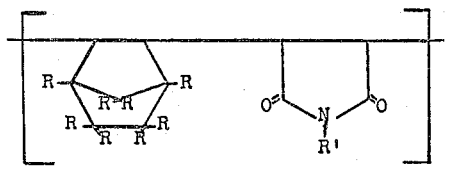

wherein R represents a member selected from the group consisting of hydrogen, hydrocarbyl having from 1 to 15 carbon atoms, and a —$C_nH_{2n}$OOCR″ radical wherein $n$ has a value of 0 to 10 and R″ is hydrocarbyl having from 1 to about 20 carbon atoms, and R′ is a hydrocarbyl radical having from 1 to 30 carbon atoms, said hydrocarbyl radicals being selected from the group consisting of alkyl, aryl, aralkyl, alkaryl and cycloalkyl.

2. The polymer bicyclo[2.2.1]hept - 2 - ene/N-octadecylmaleimide.

3. The polymer bicyclo[2.2.1]hept - 2 - ene/N-tetradecylmaleimide.

4. The polymer bicyclo[2.2.1]hept - 2 - ene/N-hexadecylmaleimide.

5. The polymer bicyclo[2.2.1]hept - 2 - ene/N-dodecylmaleimide.

6. The polymer bicyclo[2.2.1]hept - 2 - ene/N-alkylmaleimide wherein said alkyl is a mixture of tetradecyl and hexadecyl.

7. The polymer bicyclo[2.2.1]hept - 2 - ene/N-alkylmaleimide wherein said alkyl is a mixture of dodecyl, tetradecyl, hexadecyl and octadecyl.

8. The polymer bicyclo[2.2.1]hept - 2 - en-5-ylmethyl stearate/N-tetradecylmaleimide.

9. The polymer bicyclo[2.2.1]hept - 2 - en-5-ylmethyl laurate/N-alkylmaleimide wherein said alkyl is a mixture of tetradecyl and hexadecyl.

References Cited

UNITED STATES PATENTS 3,280,080  10/1966  Potter et al. _____ 260—78.5

JOSEPH L. SCHOFER, *Primary Examiner.*

J. KNIGHT, *Assistant Examiner.*